United States Patent
Cociglio

(10) Patent No.: US 11,902,118 B2
(45) Date of Patent: Feb. 13, 2024

(54) TRAFFIC MONITORING IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/316,671

(22) PCT Filed: Jul. 18, 2016

(86) PCT No.: PCT/EP2016/067023
§ 371 (c)(1),
(2) Date: Jan. 10, 2019

(87) PCT Pub. No.: WO2018/014928
PCT Pub. Date: Jan. 25, 2018

(65) Prior Publication Data
US 2019/0158368 A1 May 23, 2019

(51) Int. Cl.
*H04L 43/026* (2022.01)
*H04L 43/028* (2022.01)
(Continued)

(52) U.S. Cl.
CPC .......... *H04L 43/026* (2013.01); *H04L 43/028* (2013.01); *H04L 43/08* (2013.01); *H04L 43/12* (2013.01)

(58) Field of Classification Search
CPC ..... H04L 43/026; H04L 43/028; H04L 43/08; H04L 43/12
(Continued)

(56) References Cited

U.S. PATENT DOCUMENTS 6,188,674 B1 * 2/2001 Chen .................. H04L 43/0835
370/252
6,243,667 B1 6/2001 Kerr et al.
(Continued)

FOREIGN PATENT DOCUMENTS

CN 1677940 10/2005
CN 104753736 7/2015
(Continued)

OTHER PUBLICATIONS

International Search Report dated Jan. 23, 2017 in PCT/EP2016/067023 filed on Jul. 18, 2016.
(Continued)

Primary Examiner — Kwang B Yao
Assistant Examiner — Xuan Lu
(74) Attorney, Agent, or Firm — Oblon, McClelland, Maier & Neustadt, L.L.P.

(57) ABSTRACT

A method for monitoring packets in a communication network includes at an ingress point, classifying at least one packet of a traffic received at the ingress point for determining whether packets of the traffic are to be monitored and, in the affirmative, associating them with a service of monitoring; at the ingress point, creating a selection policy to identify a packet flow of the packets to be monitored according to the service of monitoring. The method also includes installing the selection policy at one or more measuring points within the communication network, and at each measuring point, identifying the packet flow on the basis of the selection policy. The method further includes at each measuring point, applying monitoring actions associated with the service of monitoring to the identified packet flow.

12 Claims, 7 Drawing Sheets

(51) Int. Cl.
 *H04L 43/08* (2022.01)
 *H04L 43/12* (2022.01)
(58) Field of Classification Search
 USPC ............................................. 370/329
 See application file for complete search history.

(56) References Cited

U.S. PATENT DOCUMENTS

| | | | | |
|---|---|---|---|---|
| 7,050,396 | B1* | 5/2006 | Cohen | H04L 12/2854 370/235 |
| 8,612,612 | B1* | 12/2013 | Dukes | H04L 67/141 709/203 |
| 9,088,508 | B1* | 7/2015 | Caputo | H04L 47/10 |
| 9,252,972 | B1* | 2/2016 | Dukes | H04L 49/70 |
| 2002/0122228 | A1 | 9/2002 | Rappaport et al. | |
| 2002/0133586 | A1* | 9/2002 | Shanklin | H04L 43/00 709/224 |
| 2009/0034426 | A1* | 2/2009 | Luft | H04L 41/5009 370/252 |
| 2011/0080835 | A1* | 4/2011 | Malomsoky | H04L 43/026 370/241 |
| 2011/0255440 | A1* | 10/2011 | Cociglio | H04L 43/0835 370/253 |
| 2014/0153435 | A1 | 6/2014 | Rolette et al. | |
| 2014/0376373 | A1* | 12/2014 | Deshpande | H04L 47/12 370/235 |
| 2015/0016299 | A1* | 1/2015 | Zhang | H04L 67/14 370/253 |
| 2015/0207905 | A1* | 7/2015 | Merchant | H04L 45/74 370/392 |
| 2015/0358287 | A1 | 12/2015 | Caputo, II et al. | |
| 2016/0080502 | A1* | 3/2016 | Yadav | G06F 16/285 709/227 |
| 2016/0119367 | A1* | 4/2016 | Li | H04L 63/20 726/1 |
| 2016/0359673 | A1* | 12/2016 | Gupta | G06F 16/174 |
| 2017/0223029 | A1* | 8/2017 | Sharma | H04L 63/1425 |
| 2017/0288987 | A1* | 10/2017 | Pasupathy | H04L 63/14 |
| 2017/0295035 | A1* | 10/2017 | Mathew | H04L 12/6418 |
| 2018/0048561 | A1* | 2/2018 | Bifulco | H04L 41/0893 |
| 2018/0310078 | A1* | 10/2018 | Szymanski | H04L 47/56 |

FOREIGN PATENT DOCUMENTS

| | | |
|---|---|---|
| WO | WO 2010/072251 A1 | 7/2010 |
| WO | WO 2013/032473 A1 | 3/2013 |
| WO | WO-2016123314 A1 * | 8/2016 |

OTHER PUBLICATIONS

Office Action dated Dec. 3, 2021 in Chinese Application No. 201680087771.6.

* cited by examiner

TRAFFIC MONITORING IN A PACKET-SWITCHED COMMUNICATION NETWORK

TECHNICAL FIELD

The present invention relates to the field of communication networks. In particular, the present invention relates to a method for monitoring a packet flow in a packet-switched communication network. Further, the present invention relates to a communication network implementing such method.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

A packet flow is a packet stream carried in a packet-switched communication network. In particular, a packet flow is a stream of packets having a number of features in common. For instance, in a IP communication network, these features may include one or more of: the source IP address, the destination IP address, the source port address, the destination port address, the transport protocol.

Moreover, as known, typically a packet flow is associated with a Class of Service (CoS). The CoS is introduced within the packets of the packet flow and allows giving certain types of traffic (voice, video, data, etc.) priority over others. At layer 3, a specific CoS may be assigned to each packet of the packet flow by using a 6-bit Differentiated Services Code Point (DSCP) value in the Differentiated Services (DS) field of the IP header, which allows implementing the so-called DiffServ architecture.

More in general, the packet header comprises one or more fields and any field associated with one or more bits may be used to identify or classify packet flows. Moreover, network administrators may define "new" features to identify or classify packets based on specific values of unused bits in the packet header. Such "new" features may identify the packet flow only within a network domain managed by the network administrator which defined the feature. Before crossing the boundaries between different network domains, best practices generally require that the value assigned to any of these features should be reset to its default value.

A feature of a packet flow may be expressed, in general, as a range of values associated with a specific field contained within the header of the packets. For instance, at layer 3, a feature may be defined by a range of IP addresses (e.g., a list of addresses or an IP prefix) that could be found within the IP source address field or the IP destination address field. If the DSCP is used as identifying field carrying an identifying feature, such a feature may be represented, for example, by all DSCP values different from zero.

The use of ranges of values as identifying features for packet flows may introduce a "hierarchy". Indeed, a wide range of values may identify a certain packet flow within certain nodes of the network. A smaller range of values, which is included within the wider range of values, may be used in other network nodes to identify a new packet flow which is given by a subset of the packets belonging to the packet flow identified by the wider range of values. Hierarchical classification of packet flows may be used to perform specific actions on the packets within different nodes of the network.

As an example, at layer 3, the exemplary prefix 192.168.10.0/24 within the IP source address field may identify a given packet flow in a node of the network, and this identification may be used to perform specific actions on the packets belonging to that packet flow. In another node of the network, different actions could be applied to a subset of packets belonging to the packet flow defined above, the subset of packets being in turn identified by the value 192.168.10.12 within the IP source address field.

Additional features to identify or classify packet flows may be associated with external attributes. For example, all the packets entering the network from a given physical or logical port of an ingress node may be treated as a packet flow onto which certain actions should be applied. The same identification/classification may apply to all the packets exiting the network from a given physical or logical port of an egress node.

In a communication network, in particular an IP network, traffic monitoring techniques may be employed in order to trace and monitor a traffic flow. Traffic monitoring is usually related to activities such as identifying the traffic flows being propagated through the communication network, analysing the traffic flows and providing information about them, which may be used for network management purposes including accounting, routing, load balancing, etc. In particular, the collected information may be used by network operators to detect faults, interruptions and malfunctions possibly reported by the clients of the network. Indeed, for instance, if a traffic associated with a high CoS (e.g. real time traffic) is affected by a fault or performance degradation, a network operator should intervene in order not to decrease the quality of service (QoS) of that traffic. Intervention of the network operator may be driven by the information collected by monitoring the traffic flows, which may comprise the amount of bytes and/or packets passing through the monitoring points, which allows identifying the path followed by the packets and locate the fault.

U.S. Pat. No. 6,243,667 B1 discloses a method and system for switching in networks responsive to message flow patterns. A message "flow" is defined to comprise a set of packets to be transmitted between a particular source and a particular destination. When routers in a network identify a new message flow, they determine the proper processing for packets in that message flow and cache that information for that message flow. Thereafter, when routers in a network identify a packet which is part of that message flow, they process that packet according to the proper processing for packets in that message flow. The proper processing may include a determination of a destination port for routing those packets and a determination of whether access control permits routing those packets to their indicated destination.

US 2011/0080835 A1 discloses a monitoring system for monitoring transport of data through interconnected nodes for processing data packets in a communication system, wherein said data packets conform to a layered transmission protocol, the system comprising: (1) a marking node for marking a packet selected according to a marking rule by placing a monitoring indicator in the lowest protocol layer thereof, said data packet having a first number of protocol layers, (2) at least, one packet processing node for forming a data packet based or the marked packet, such that said formed data packet comprises a second number of protocol layers that is different from said first number of protocol layers and such that said indicator is in the lowest protocol layer of said formed data packet, and (3); a monitoring node for monitoring said transport of data on the basis of the indicators in data packets that have passed through the at least one packet processing node.

SUMMARY OF THE INVENTION

The Applicant has noticed that the above known solutions for monitoring a packet flow in a packet-switched communication network have some drawbacks.

As to the method of U.S. Pat. No. 6,243,667 B1, it requires that each packet that is forwarded within a router or switch is examined for a set of IP packet attributes (e.g. IP address of the source device, IP address of the destination device, protocol type) before being treated by the routing device. Treatment of packets may relate to, for example, switching, access control, accounting, or encryption. Therefore, the implementation of the cited method requires that all the routing devices of the network should be a priori configured to examine the packets having a given set of IP attributes, irrespective of the actual path followed by the packets of the flow to be monitored. This may lead to a waste of network resources. Moreover, each time a new data flow is to be monitored, a new configuration is to be set up on the routing devices specifying the IP attributes that identify the new data flow. This is disadvantageously inefficient.

Indeed, a packet-switched communication network may contain hundreds or thousands of nodes (such as routers, switches, etc.). A packet flow enters the network through one or more ingress nodes and exits through one or more egress nodes. Packets are carried from an ingress node to an egress node crossing intermediate nodes. In meshed network topologies, it is not possible to know in advance the path through which a packet travels. In fact, packets are routed according to rules defined by automated operations of the network nodes, including load balancing over different paths, rerouting in case of node or link failures, etc. This way of operation implies that packets belonging to a data flow could possibly cross any intermediate node within the network. To be sure to detect all the packets belonging to a data flow for monitoring purposes, packet identification or classification have to be accomplished at every intermediate nodes. The number of intermediate nodes multiplied by the number of data flows that may be present within the network may lead to an unsustainable number of classification rules to be deployed in the network nodes and an unmanageable burden of configuration effort.

In view of the above, the Applicant has tackled the problem of providing a method for monitoring a packet flow in a packet-switched communication network, which overcomes the aforesaid drawbacks. In particular, the Applicant has tackled the problem of providing a method for monitoring a packet flow in a packet-switched communication network, which allows a minimal pre-configuration of the network nodes, minimizes the number of classification rules to be deployed in the network nodes and automates the enforcement of given services of monitoring to the data flows.

In the following description and in the claims, the expression "service of monitoring" (briefly, "SoM"), will designate a service offered to a user/client/subscriber of a communication network by the network operator according to which a data traffic of the user/client/subscriber who requests for the service is monitored. This operation may include one or more of the following monitoring actions: identifying the data traffic to be monitored (in order to trace the route of the data traffic), counting the packets received and/or transmitted at one or more measuring points (in order to measure e.g. a data loss), timestamping the packets received and/or transmitted at one or more measuring points (in order to measure e.g. a jitter or a delay). As an example, different SoMs may be defined for monitoring different types of data traffic, such as IP, ADSL (Asymmetric Digital Subscriber Line), LTE (Long Term Evolution), GSM (Global System for Mobile communications), etc.

Furthermore, the term "user" or "client" of the communication network, or "subscriber to a SoM" may designate an entity which is generating or receiving data traffic through the communication network, which has requested a SoM in order to have its data traffic monitored by the communication network. These terms will be used interchangeably within the following description. Examples of users/clients/subscribers include private entities (i.e. persons) and business entities (i.e. companies). Moreover, they may include network internal entities (i.e. departments within the organization of the network operator). As an example, a SoM may be applied to monitor the data traffic generated by the branches of a company at given locations.

According to a first aspect, the present invention provides a method for monitoring packets in a communication network (CN), the method comprising:

a) at an ingress point of the communication network, classifying at least one packet of a traffic received at the ingress point for determining whether packets of the traffic are to be monitored and, in the affirmative, associating them with a service of monitoring;

b) at the ingress point, creating a selection policy to identify a packet flow of the packets to be monitored according to the service of monitoring;

c) installing the selection policy at one or more measuring points within the communication network;

d) at each of the one or more measuring points, identifying the packet flow on the basis of the selection policy;

e) at each of the one or more measuring points, applying monitoring actions associated with the service of monitoring to the identified packet flow.

Preferably, classifying is performed by applying a classification policy comprising one or more classification rules to be applied to one or more classification attributes of the packets.

Preferably, the one or more classification attributes are defined among identifying attributes comprised within a header of the packets.

Preferably, the identifying attributes comprise one or more of: a source address, a destination address, a source port number, a destination port number, a transmission protocol, a class of service.

Preferably, creating a selection policy comprises applying selection policy creation instructions associated with the service of monitoring.

Preferably, the selection policy comprises one or more predefined values or ranges for one or more selection attributes for identifying the packets of the packet flow, the selection attributes being defined among the identifying attributes of the packets.

According to a first embodiment of the present invention, the method further comprises, at the ingress point, after step b), marking the packets of the packet flow to be monitored.

Preferably, marking comprises setting a feature of each packet of the packet flow to be monitored to a given value suitable for distinguishing the packet flow to be monitored from another packet flow that is not to be monitored.

Preferably, marking comprises setting one or more bits of a given field of a header of each packet of the packet flow to be monitored to a predetermined value.

Preferably, the method further comprises, at an egress point of the communication network, restoring the feature of the marked packet to a predetermined restoration value associated with the selection policy.

Preferably, the method further comprises, at the measuring point (MsP), before the step c):
checking whether a received packet matches a selection policy already installed at the measuring point (MsP); and, in the negative:
checking whether the received packet is marked; and, in the affirmative:
sending a request from the measurement point (MsP) to a monitoring center (MC); and
receiving from the monitoring center (MC) the selection policy to be installed.

According to a variant of the first embodiment of the present invention, marking comprises subdividing the packets of the packet flow to be monitored in first blocks and second blocks, the first blocks alternating in time with the second blocks, by setting the feature of the packets of the first blocks to a first predetermined value, and setting the feature of the packets of the second blocks to a second predetermined value different from the first predetermined value.

According to a second embodiment of the present invention, the method further comprises, after step b), sending the selection policy from the ingress point to a monitoring center, and step c) comprises installing the selection policy at the one or more measuring points by the monitoring center.

According to a third embodiment of the present invention, the method further comprises, after step b), creating, on the basis of the selection policy, a further selection policy to identify a further packet flow of packets to be monitored along an opposite direction with respect to the packet flow.

According to a second aspect, the present invention provides a node for a communication network comprising:
an ingress point configured to classify at least one packet of a traffic received at the node for determining whether packets of the traffic are to be monitored and, in the affirmative, associate them with a service of monitoring, and further configured to create a selection policy to identify a packet flow of the packets to be monitored according to the service of monitoring; and
a measuring point configured to identify the packet flow to be monitored on the basis of the selection policy, and apply monitoring actions associated with the service of monitoring to the identified packet flow.

According to a third aspect, the present invention provides a communication network comprising a first node as set forth above and a second node configured to receive the packet flow, the node comprising a measuring point configured to identify the packet flow to be monitored on the basis of the selection policy, and apply monitoring actions associated with the service of monitoring to the identified packet flow.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
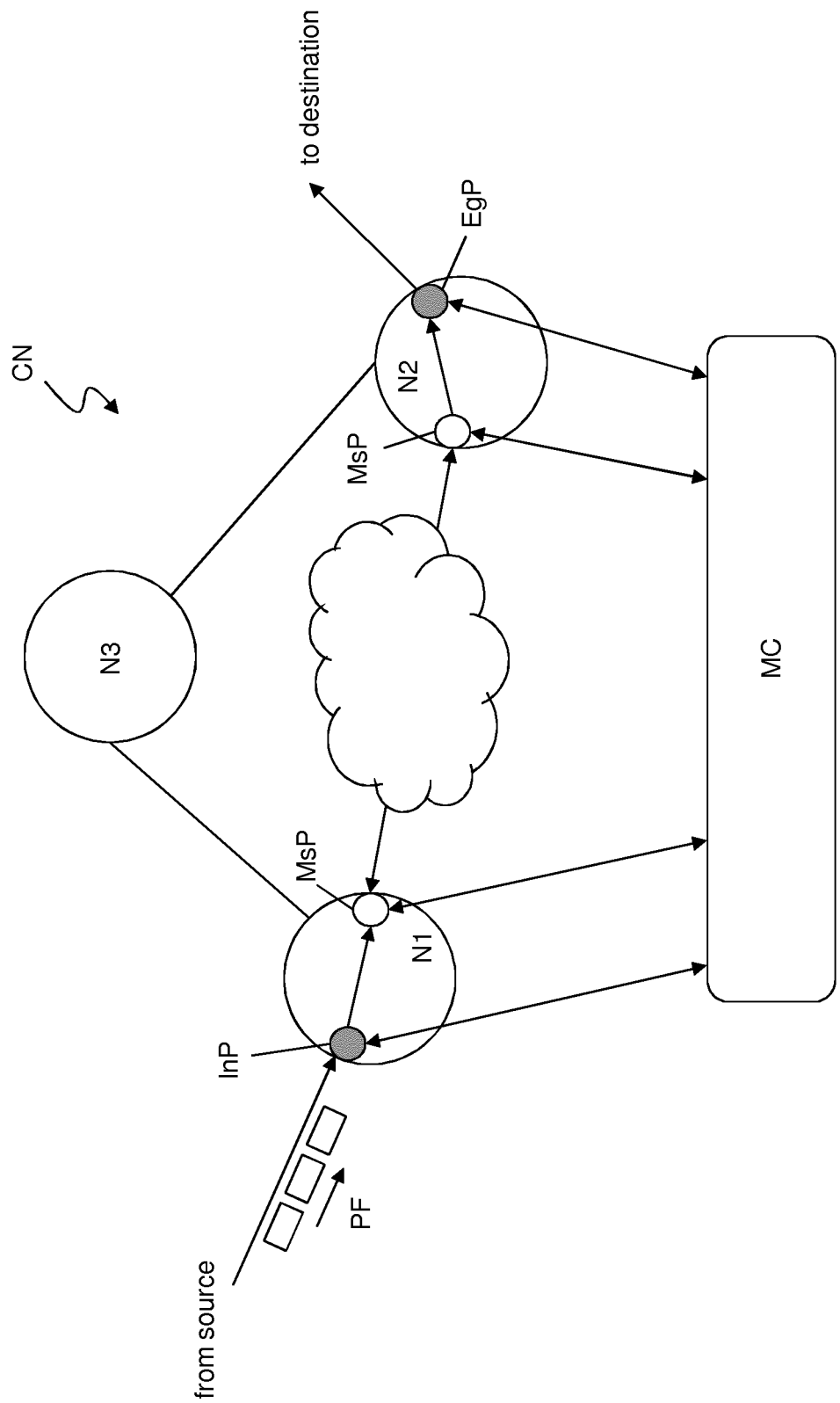
FIG. 1 schematically shows an exemplary packet-switched network.

FIG. 1 schematically shows an exemplary packet-switched communication network CN in which the method for monitoring a packet flow according to embodiments of the present invention may be implemented. The communication network CN may be an IP network, an Ethernet network, an MPLS network or any other known type of packet-switched communication network.

The communication network CN comprises a plurality of nodes reciprocally interconnected by links according to any known topology.

In particular, the communication network CN comprises a first node N1 and a second node N2. The first node N1 is configured to transmit a packet flow PF in the form of packets Pki to the second node, possibly through intermediate nodes (not shown in FIG. 1) of the communication network CN. The packets Pki may be generated at the first node N1 or outside the communication network CN. In this latter case, the first node N1 is preferably the ingress node for the packets Pki, i.e. the node through which the packets Pki enter the communication network CN.

Similarly, the second node N2 may be either the destination node of the packets Pki or an intermediate node of a packets' route from a source node to a destination node. For sake of example, in FIG. 1, the first node N1 receives the packets Pki from one or more source nodes (not shown in FIG. 1) outside the communication network CN and the second node N2 transmits the packets Pki to one or more destination nodes which may be within the communication network CN or outside it (not shown in FIG. 1). In this latter case, the second node N2 is preferably the egress node for the packets Pki, i.e. the node through which the packets Pki exit the communication network CN.

Preferably, the communication network CN is also suitable for cooperating with a monitoring center MC, which will be described in greater detail herein after. The monitoring center MC may be either a stand-alone server connected to any of the nodes of the communication network CN. Alternatively, the monitoring center MC may be implemented at any of the nodes of the communication network CN through dedicated software and/or hardware.

Figure 2:
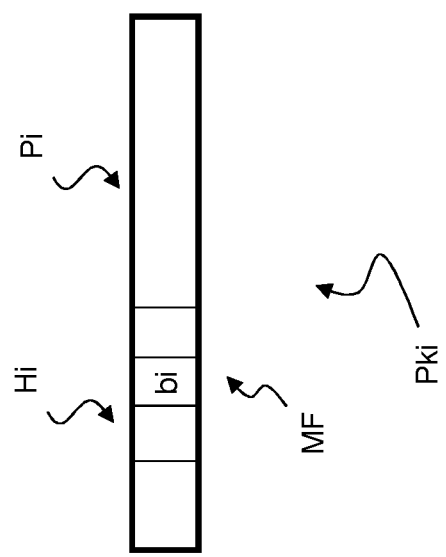
FIG. 2 schematically shows a packet's structure, according to an embodiment of the present invention.

As shown in FIG. 2, each packet Pki comprises a header Hi and a payload Pi. The payload Pi comprises data to be transmitted. Moreover, preferably, the header Hi comprises information for routing the packet Pki, such as the source node address (or, simply, source address) and the destination node address (or, simply, destination address).

The present invention provides a method for monitoring the packets of the packet flow PF within the communication network CN which allows applying, in an automatic manner, a given service of monitoring (or, simply, "SoM") on the packet flow PF.

According to embodiments of the present invention, the method for monitoring the packets of the packet flow PF according to a given SoM comprises:

a) at an ingress point, classifying at least one packet of the traffic received at the ingress point for determining whether packets of the traffic are to be monitored and, in the affirmative, associating them with the given SoM;

b) at the ingress point, creating a selection policy to identify a packet flow of packets to be monitored according to the SoM;

c) installing the selection policy associated with the SoM in one or more measuring points within the communication network;

b) at each measuring point, identifying the packet flow to be monitored as the packet flow matching the selection policy associated with the SoM;

c) at each measuring point, applying monitoring actions associated with the SoM to the identified packet flow.

According to an embodiment of the present invention, the method further comprises, after step b) above, marking the packets of the packet flow matching the created selection policy and, optionally, at an egress point, restoring the marked packets to a pre-determined content, as it will be described herein after.

In the following description, the method above will be described in greater detail.

According to embodiments of the present invention, a service of monitoring or SoM is associated with:
  a monitoring policy;
  a list of ingress points;
  one or more classification policies, each associated with an ingress point;
  selection policy creation instructions;
  one or more selection policies, which are dynamically created at the ingress points as it will be described herein after ;
  a list of possible egress points.

According to the present invention, a SoM is associated with a monitoring policy. The monitoring policy of a SoM preferably specifies the monitoring actions to be performed on packets for implementing the SoM. Monitoring actions may include, for instance, tracking, counting or timestamping the packet for performing a measurement of packet loss and/or a measurement of a delay.

According to the present invention, for a given SoM, a number of ingress points are preferably instantiated at the nodes through which packets to be monitored enter the communication network (ingress nodes). Exemplarily, the ingress nodes through which packets to be monitored enter the communication network are the network's nodes attached to devices of the SoM's subscribers and/or the network's nodes located at or near the subscribers' premises (e.g. houses, shops, offices, branches). For each SoM, upon deployment, a list of ingress points is preferably stored at the monitoring center MC, as it will be further described herein after.

An ingress node may act as ingress point for different SoMs.

At an ingress point of a SoM, packets are classified as mentioned above. Preferably, classifying the packets at the ingress point is performed by applying a classification policy that associates one or more classification rules with the SoM.

Applying the classification policy to a packet comprises checking whether the packet matches the corresponding classification rules. One exemplary classification rule may provide for determining that all the packets of the traffic received at an ingress point are to be monitored. Another exemplary classification rule may provide for determining that only part of the packets of the traffic received at the ingress point are to be monitored according to the given SoM. This determination may be performed on the basis of one or more identifying attributes, which are among the data contained within the packet.

The identifying attributes of a packet preferably comprise one or more features or attributes contained within the header of the packet. These attributes may correspond to respective fields or portions of field of the packet header. For instance, in case of an IP communication network, the one or more identifying attributes which may be used comprise: IP source address, IP destination address, source port number, destination port number, transport protocol, CoS. Additional identifying attributes may indicate the physical or logical port through which the packets enter the communication network. For example, a classification rule may specify that the packets to be monitored are, among the packets received at the ingress point, those being identified with a CoS equal to, for instance, 3. Further, another exemplary classification rule may specify that the packets to be monitored are those whose transport protocol is the Transmission Control Protocol (TCP). The identifying attributes used in the classification rules of the classification policy will also be referred to, in the following description and in the claims, as "classification attributes".

A packet matching the set of classification rules of a given classification policy will be referred to also as "matching the classification policy".

Preferably, according to the present invention, a SoM is preferably associated with a list of selection policies which may be statically or dynamically handled by the ingress point InP of the SoM and the monitoring center MC, as it will be described herein after. According to embodiments of the present invention, a SoM selection policy is preferably created at the ingress point InP of a SoM upon reception of the first packet Pki of the packet flow PF to be monitored. The selection policy of a SoM is preferably associated with the following information:
  the relevant SoM;
  the ingress point InP at which the selection policy is created; and
  one or more measuring points MsP at which the selection policy is installed.

Optionally, the selection policy comprises a restoration value to be applied at a SoM egress point EgP.

According to the present invention, at an ingress point InP of a SoM, a SoM selection policy is derived from a classification policy on the basis of the selection policy creation instructions associated with the SoM. As it will be described in greater detail herein after, the selection policy created at an ingress point InP is then installed at a number of measuring points MsP along the route of the packets within the communication network CN, for identifying the packets of a given packet flow to be monitored according to the given SoM. In particular, the selection policy provides for identifying the packets to be monitored on the basis of the one or more identifying attributes of the packet already used for classification purposes (namely the classification attributes, such as, e.g., the CoS and/or the transport protocol), and, possibly, other identifying attributes (such as, e.g., the source address, the destination address, the couple of source and destination addresses). In particular, the selection policy may specify specific ranges or discrete values for the considered identifying attributes. Preferably, the ranges of the identifying attributes specified in the selection policy are equal to or smaller than the ranges for the same identifying attributes possibly specified in the classification policy. The identifying attributes used in the selection policy will also be referred to, in the following description and in the claims, as "selection attributes".

In other words, the selection policy provides the packets' granularity with which a given SoM is applied and defines the packet flows on which the monitoring actions are to be applied. For instance, at an ingress point InP all the packets may match a classification policy, but, as it will be described herein after, a selection policy may be created for each pair of source address and destination address, or for each source address, for instance. Each time a selection policy is created, a new packet flow to be monitored according to the given SoM is defined.

Any packet matching a selection policy is preferably monitored according to the monitoring policy associated with the relevant SoM. The monitoring policy preferably specifies one or more monitoring actions to be performed on the packet (such as, for instance, tracking, counting, time-stamping).

For instance, in an IP communication network, at layer 3, a classification policy may specify that all packets received at an ingress point of a given SoM are to be monitored. Then, a selection policy may be created specifying that the given SoM is to be applied to packets associated with a given set of IP source addresses in the IP source address field, this set being identified by one or more IP prefixes. In this case, no identifying attribute is used for classification, while the attribute used in the selection policy is the IP source address of the packet, in particular the prefix of the IP source address. One monitoring action to be performed according to the SoM may be a data loss measurement and the selection policy creation instructions may specify that such measurement is to be made on every different packet flow comprising a different IP source address within the range specified in the selection policy. Alternatively or in addition, different selection policies may be created at the considered ingress point for monitoring packet flows comprising different couples of IP source address and IP destination address. In this case, the identification of the packets in the selection policy is based on two attributes of the packet, the IP source address and the IP destination address.

For instance, if a SoM is to be applied to an LTE packet flow within a backhauling network segment (from an enodeB to the nodes of a packet core network, within a metro-regional aggregation area), the selection policy may specify that packets are monitored on the basis of the couple of source address and destination address, namely: in the uplink direction, the address of the eNodeB and the address of the Packet Data Network Gateway (PGW), and, in the downlink direction, the address of the Serving Gateway (SGW) and the address of the eNodeB. This is the case of a SoM devoted to internal operations of a service provider.

According to another example, if the SoM to which the user has subscribed to provides for monitoring packets related to a given user business location, the selection policy may provide for identifying the packet flow to be monitored on the basis of the IP source address contained in the header Hi of each packet Pki. Moreover, for instance, the selection policy may specify the routing prefix of the IP source address contained in the header Hi of the packet Pki. This is the case of a SoM dedicated to a given customer of a service provider, and can be part of a service offering.

Preferably, while a SoM may comprise different selection policies, a selection policy is associated with a single SoM. Indeed, as already mentioned above, the different selection policies of a SoM may identify the packet flows to be monitored on the basis of different identifying attributes in cases where, for instance, the same monitoring actions are applied to packets having a given source address and to packets having a given couple of source and destination addresses.

According to an embodiment of the present invention, each packet matching a selection policy at an ingress point is marked. Marking a packet is preferably performed by setting a feature of the packet to a given value suitable for distinguishing the packets of a packet flow to be monitored from the packets of another packet flow that is not to be monitored. In particular, marking may be performed by setting one or more bits of a given field of the packet's header Hi, for each protocol layer, to a predetermined value. This field may be for instance a field to which the protocol according to which the packets Pki are formatted has not assigned a specific function yet. Alternatively, bits of a field having other uses may be used.

As represented in FIG. 2, according to this embodiment, each packet Pki of the packet flow PF comprises a marking field MF, which comprises at least one bit bi of a given field of the packet, which is used for marking the packet (marking bit). The marking field MF is preferably comprised in the packet's header Hi. According to this embodiment of the present invention, a value different from zero (for instance, 1) is used for marking packets to be monitored according to SoMs deployed within the communication network CN. On the contrary, a value equal to zero of these same bits may identify packets that are not associated with any actual service of monitoring deployed within the communication network CN.

According to the present invention, for a given SoM, a number of egress points is preferably instantiated at the nodes through which packets to be monitored exit the communication network (egress nodes). At an egress point, a marked packet is optionally restored to a pre-determined content. Restoring the marked packet to a pre-determined content comprises, preferably, replacing the one or more bits of the marking field MF of the packet with a pre-determined restoration value. The restoration value is optionally associated with the selection policy identifying the packet flow, as it will be described in greater detail herein after. This value may be a default value or the value that the one or more bits had before the packet has been marked. This operation advantageously allows restoring the content of the packet to the data carried by the packet before marking. In this way, the packet may travel within the communication network CN with a format suitable for monitoring purposes and it may then exit the communication network CN with its original content.

In the following lines, the entities already mentioned above allowing to implement the method of the present invention will be described in greater detail.

Preferably, the monitoring center MC is a centralized element configured to manage, control and coordinate the services of monitoring offered by the network operator within its communication network CN. The monitoring center MC may communicate with the nodes of the communication network CN to configure the nodes for monitoring purposes, as it will be described in detail herein after.

Moreover, the monitoring center MC may communicate with the nodes also to collect monitoring results and warning reports.

As already mentioned above, ingress points InP are set up at ingress nodes of the communication network CN, i.e. nodes through which packets enter the communication network CN. This operation comprises configuring the ingress nodes as ingress points for a given SoM by installing therein at least one classification policy, the selection policy creation instructions and the monitoring policy of the SoM, as it will be described herein after. In particular, in the exemplary situation depicted in FIG. 1, an ingress point InP is set up at node N1 through which the packet flow PF enters the communication network. An ingress point InP is preferably implemented at an ingress interface or port of an ingress node N1. For instance, if the packet flow PF to be monitored is an IP packet flow, the ingress point InP is implemented at an IP ingress interface of the ingress node N1. The ingress point InP is preferably implemented through a dedicated software and/or hardware.

According to embodiments of the present invention, egress points EgP may be set up at egress nodes of the communication network CN. In particular, in the exemplary situation depicted in FIG. 1, an egress point EgP may be set up at node N2 through which the packet flow PF exits the communication network.

The egress point EgP is preferably implemented at an egress interface or port of an egress node N2. For instance, if the packet flow PF to be monitored is an IP packet flow, the egress point EgP is implemented at an IP egress interface of the egress node N2. The egress point EgP is preferably implemented through a dedicated software and/or hardware.

Preferably, measuring points MsP are set up at nodes which are crossed by the packets to be monitored. These nodes comprise ingress nodes, egress nodes, and intermediate nodes between ingress and egress nodes along the route of the packet flow PF.

The operation of setting up a measuring point MsP may comprise configuring the nodes as measuring points by installing therein one or more selection policies and corresponding monitoring policies, as it will be described herein after. In the exemplary network of FIG. 1, a measuring point MsP is preferably set up at both an ingress interface and at a corresponding egress interface of each network node of the communication network CN along the route of the packet flow PF. For instance, if the packet flow PF to be monitored is an IP packet flow, the measuring points MsP are implemented at both the IP ingress and egress interfaces of the ingress node N1, at the IP ingress and egress interfaces of the egress node N2 and at the IP ingress and egress interfaces of any intermediate node therebetween.

In the present description and in the claims, the ingress point preferably incorporates the functionalities of the measuring point at the ingress interface of the ingress node of the communication network CN for the considered packet flow PF. The expression "measuring point" in the following description will indicate the intermediate measuring points, namely the measuring points instantiated at the intermediate interfaces or ports between the ingress interface and the egress interface through which the packets to be monitored respectively enter and exit the communication network CN, and the measuring points instantiated at the egress interfaces of the egress nodes of the communication network CN, which may incorporate also the functionalities of the egress points.

Each measuring point MsP is preferably implemented through a dedicated software and/or hardware.

It is to be noticed that according to the present invention, the measuring points are not instantiated a priori at the nodes of the communication network CN. The nodes (in particular, the interfaces) hosting the measuring points are configured to apply the monitoring policy only upon identification (by means of the selection policy) of a packet to be monitored. This means that those nodes do not have computational resources which are permanently assigned to implement the SoM. As it will be described in greater detail herein after, each node hosting a measuring point can be configured to create the processing elements (counters, timers, etc.) needed for monitoring the packets only upon identification of packets to be monitored and to cancel those processing elements when the relevant selection policy is uninstalled.

As depicted in FIG. 1, the ingress points InP, the measuring points MsP and the egress points EgP are preferably connected to the monitoring center MC and may bidirectionally exchange data with the monitoring center MC.

In the following description, the method for monitoring the packet flow PF within the communication network CN according to embodiments of the present invention will be described with reference to the flowcharts of FIGS. 3, 4, 5, 6 and 7

According to the embodiments of the present invention, upon deployment of a service of monitoring SoM within the communication network CN, the corresponding policies (namely, at least one classification policy and the monitoring policy), the selection policy creation instructions and the list of ingress and egress points of the SoM are preferably installed and stored at the monitoring center MC by, e.g., the network operator responsible of the service of monitoring.

Figure 3:
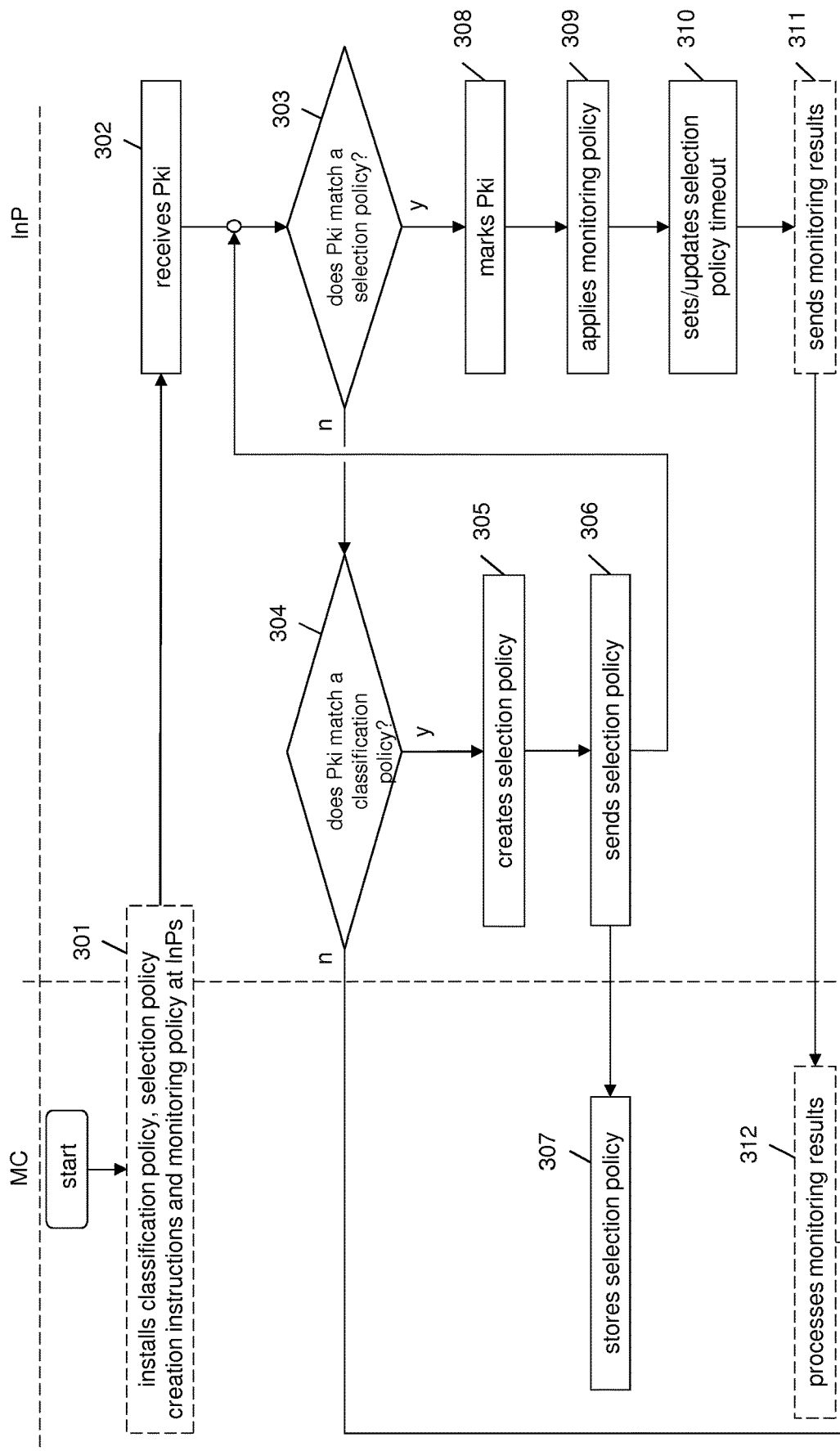
FIG. 3 is a flowchart of the method for monitoring a packet flow according to a first embodiment of the present invention.
Figure 4:
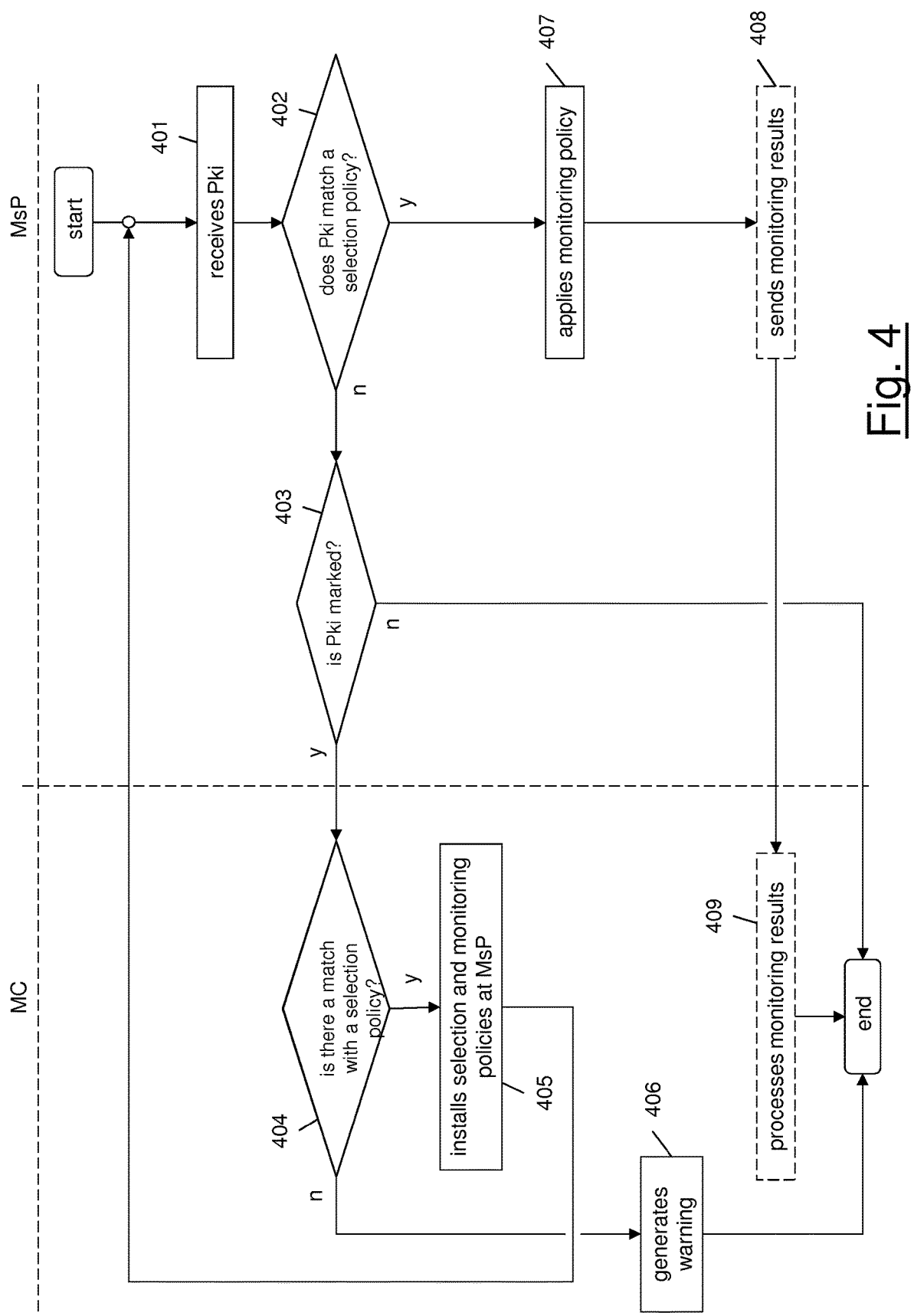
FIG. 4 is another flowchart of the method for monitoring a packet flow according to the first embodiment of the present invention.

Firstly, the method for monitoring the packet flow PF within the communication network CN according to the first embodiment the present invention will be described herein after, with reference to the flowcharts of FIGS. 3 and 4. FIG. 3 is a flowchart describing the operations an ingress point InP through which packets Pki enter the communication network CN in connection with the monitoring center MC. FIG. 4 shows a flowchart related to the operations of a measuring point MsP along the route of the packets Pki in the communication network CN in connection with the monitoring center MC. It is to be noticed that the operations related to the ingress point InP and the operations related to the measuring point MsP are preferably the same for all the ingress points InP and the measuring points MsP set up within the communication network CN, respectively.

The method according to this first embodiment of the present invention will be described as applied to each packet Pki of the packet flow PF indicated in FIG. 1, which is assumed to be the packet flow of a user of the communication network CN which has subscribed to the considered SoM.

At step 301, upon subscription by the user to the SoM, the monitoring center MC preferably installs in the ingress point InP of the first node N1, though which the packet flow PF enters the communication network CN, a classification policy associated with the SoM, the selection policy creation instructions and the monitoring policy associated with the SoM. This step is preferably performed once, before the ingress point InP starts receiving the packets Pki. For this reason, step 301 is indicated in the flowchart of FIG. 3 in a dashed box.

At step 302, the ingress point InP at the first node N1 preferably receives a packet Pki of the packet flow PF. At step 303, the ingress point InP preferably checks whether the packet Pki is associated with (or matches) a selection policy already installed at the ingress point InP (which will be referred to in the following description as "local selection policy").

In order to determine whether the packet Pki is associated with a local selection policy, the ingress point InP preferably checks whether the identifying attributes of the packet Pki match any local selection policy. In particular, the ingress point InP may check whether the one or more identifying attributes used as selection attributes of the packet Pki belong to given ranges (or, are equal to given values) specified within the local selection policy.

According to embodiments of the present invention, a selection policy for a given monitoring service SoM is created and then installed in the ingress point InP upon arrival of the first packet Pki belonging to the packet flow PF to be monitored. When the first packet Pki of the packet flow PF arrives at the ingress point InP (step 302), no local selection policy is found matching the packet Pki (step 303). Then, at step 304, the ingress point InP preferably checks whether the packet Pki matches at least one of the classification policies of the SoM that have been installed at the ingress point InP by the monitoring center MC at step 301. If the packet Pki does not match any classification policy, no actions are further taken by the ingress point InP and the packet is forwarded without being monitored. If, at step 304, the packet Pki matches one classification policy, the ingress node InP preferably determines that the packet Pki belong to a packet flow that is to be monitored and uses the selection policy creation instructions associated with the SoM to create the selection policy (step 305). In particular, the selection policy creation instructions are applied on the identifying attributes contained within the header Hi of the packet Pki and provide a selection policy that allows identifying the packets Pki of the packet flow PF to be monitored on the basis of given values of the one or more identifying attributes used as selection attributes.

At the same time, the ingress point InP preferably sets a timeout associated with the selection policy. When the selection policy is created, the timeout is preferably set to a value indicating a pre-determined time interval. Then, as it will be clearer from the following description, the timeout is updated every time a packet Pki matches the selection policy and is monitored at the ingress point InP.

At step 306, the ingress point InP preferably sends a message to the monitoring center MC comprising the selection policy that has been created. The message sent by the ingress point InP to the monitoring center MC preferably also comprises data indicating the ingress point InP, the service of monitoring and, optionally, the restoration value. At step 307, the monitoring center MC receives the message from the ingress point InP, stores the selection policy in a database and associates with the selection policy the information related to the ingress point InP at which the selection policy has been created, the service of monitoring and, possibly, the restoration value received from the ingress point InP.

It is to be noticed that the operations described above do not affect the forwarding of packets from the considered node N1 to other nodes of the communication network CN. Indeed, while the ingress point InP and the monitoring center MC perform steps 304-307, the packets received at the considered node N1 are forwarded without delay.

After the selection policy is created at the ingress point InP, when a packet Pki of the packet flow PF to be monitored is received at the ingress point InP (step 302), at step 303 the check performed by the ingress point InP is affirmative, i.e. the packet Pki matches the local selection policy created and installed at the ingress point InP. Then, at step 308, the ingress point InP preferably marks the packet Pki. According to embodiments of the present invention, marking a packet Pki is performed by setting the value of the marking bit bi to 1. The operation of marking the packet Pki is preferably repeated for each packet Pki of the packet flow PF to be monitored.

At step 309, the ingress point InP preferably applies the monitoring policy associated with the local selection policy and the considered SoM. The packet Pki is hence subject to the monitoring actions specified in the monitoring policy (e.g. packet tracing, packet tracing and counting, measurement of the packet loss and/or delay and/or jitter). Then, at step 310 the ingress point InP preferably updates the timeout associated with the local selection policy. Updating of the timeout is preferably performed by setting the timeout to its original pre-determined value. In this way, each time a packet is monitored, the timeout restarts. On the contrary, if the ingress point InP does not receive packets to be monitored for a time period equal to the pre-determined time interval associated with the timeout, the timeout preferably elapses.

At step 311, the ingress point InP preferably sends the results of the monitoring actions performed on the packets Pki to the monitoring center MC. This step, and the next one, are indicated in a dashed box because, unlike steps 302-310 of the method of the present invention, they are preferably not performed for each packet Pki of the packet flow PF. Sending the monitoring results to the monitoring center MC may be performed only once, at the expiration of a further timeout during which no packets Pki of the packet flow PF are received at the ingress point InP. Alternatively, sending the monitoring results to the monitoring center MC may be performed periodically. The mode according to which the results are sent to the monitoring center MC (either only once or periodically) is preferably specified in the monitoring policy, which in the latter case also specifies the period. Moreover, together with the monitoring results, the ingress point InP may also send to the monitoring center MC further related information that may comprise: an identifier of the ingress point InP, an identifier of the network node on which the measuring point InP is instantiated, an indication of the monitoring service SoM that is applied, an indication about the date and time-of-the-day at which the results have been collected.

At step 312, the monitoring center MC preferably processes the monitoring results in order to derive information about the packet flow PF. Processing of the monitoring results may be performed only once, at the expiration of a timeout during which no packets Pki of the packet flow PF are received at the ingress point InP. Alternatively, step 312 may be performed periodically. The results of the processing performed at the monitoring center MC may be sent to a network management center. Then, the network management center can take actions on the basis of the results of the SoM. These actions may involve, for instance, rerouting the packets if a failure is detected on the basis of the monitoring results.

Referring now to the flowchart of FIG. 4, the operations performed by a measuring point MsP in connection with the monitoring center MC according to the first embodiment of the present invention will be described in detail.

Preferably, when a measuring point MsP (for instance, with reference to FIG. 1, the measuring point instantiated at the egress port of the ingress node N1, or any other measuring point in one of the intermediated nodes between the ingress node N1 and the egress node N2) receives a packet Pki (step 401), it preferably checks whether the packet Pki matches a local selection policy, namely a selection policy already installed at the measuring point MsP (step 402). If the packet Pki does not match a local selection policy, the measuring point MsP preferably checks whether the packet Pki is marked (step 403). If the packet Pki is not marked, no actions are further taken by the measuring point MsP and the packet is routed through the communication network CN until the destination node N2 without being monitored. In case at step 403 the measuring point MsP finds that the packet Pki is marked, the measuring point MsP preferably sends a message to the monitoring center MC containing the identifying attributes of the packet Pki and a request to check whether the packet Pki matches one of the selection policies stored at the monitoring center MC. The message also comprises an identifier of the measuring point MsP. At step 404, the monitoring center MC preferably checks whether the packet Pki matches one of the selection policies stored therein. In case the packet Pki does not match any stored selection policy, the procedure ends. In this case, a warning signal or message may be generated by the monitoring center MC (step 406). In case at step 404 the monitoring center MC finds that the packet Pki matches a selection policy, it preferably installs the selection policy at the measuring point MsP (step 405). Preferably, the monitoring center MC installs also, at the measuring point MsP, the monitoring policy associated with the selection policy and, optionally, sends to the measuring point MsP the corresponding restoration value. In the meantime, the monitoring center MC preferably associates with the selection policy the identifier of the measuring point MsP and updates the information on the selection policy stored therein with the measuring point identifier. In this way, the information associated with a selection policy at the monitoring center MC is dynamically updated each time a packet is received by a measuring point MsP along the route towards the egress node N2. Indeed, the monitoring center MC stores, for each selection policy, a list of the relevant measuring points (namely, the measuring points that shall apply the monitoring policy associated with the considered selection policy), which is dynamically populated with the identifiers of the measuring points crossed by the packet Pki.

It is to be noticed that the operations described above do not affect the forwarding of packets from the considered node to other nodes of the communication network CN. Indeed, while the measuring point MsP and the monitoring center MC perform steps 403-406, the packets received at the considered node are forwarded without delay.

After the selection policy is installed at the measuring point MsP, when a packet Pki of the packet flow PF is received at the measuring point MsP (step 401), at step 402 the check performed by the measuring point MsP is affirmative, i.e. the packet Pki matches the local selection policy installed at the measuring point MsP.

At step 407, the measuring point MsP preferably applies the monitoring policy associated with the local selection policy and the considered SoM. The packet Pki is hence subject to the monitoring actions specified in the monitoring policy (e.g. packet tracing, packet tracing and counting, measurement of the packet loss and/or delay and/or jitter).

At step 408, the measuring point MsP preferably sends the results of the monitoring actions performed on the packets Pki to the monitoring center MC, as already described above with reference to step 311 of the flowchart of FIG. 3. At step 409, the monitoring center MC preferably processes the monitoring results in order to derive information about the packet flow PF, as already described above with reference to step 312 of the flowchart of FIG. 3.

As already mentioned above, the operations described above with reference to a measuring point MsP are preferably performed also by the ingress point InP (as described with reference to the flowchart of FIG. 3) and by the egress point EgP. Optionally, the egress point EgP restores the bits of the marking field MF to the restoration value.

As described above, when a selection policy is created at an ingress point InP (step 305 of the flowchart of FIG. 3), it is then stored at the monitoring center MC and afterwards installed at each measuring point MsP (and also at the measuring points acting as egress points EgP) crossed by the packets Pki of the considered packet flow PF. According to the described embodiment of the present invention, installation of the selection policy at the measuring point MsP is performed upon request by the measuring point MsP. Therefore, the packets Pki that, in the meantime, are received by the ingress point InP and by the measuring points MsP may not be subject to any monitoring action because they may not match any selection policy. In other words, the relevant selection policy may not be already installed at the ingress point InP and/or the measuring points MsP when these packets are received by the ingress point InP and/or the measuring points MsP. Therefore, the results of the monitoring actions performed on the packets Pki of the packet flow PF until the selection policy is installed at all the measuring points MsP along the route of the packets may be unreliable. Hence, the present invention provides for discarding, at the monitoring center MC, the results of the monitoring actions performed on the packets Pki for a given amount of time corresponding substantially to the time period since reception of the first packet Pki of the considered packet flow PF to be monitored at the ingress point InP until the installation of the selection policy at the egress point EgP. This amount of time may depend on the performances of the monitoring center MC, and in particular on the time taken by the monitoring center MC to answer the requests sent by the measuring points MsP according to step 403 of the flowchart of FIG. 4 described above. This amount of time may be equal to few seconds.

According to a variant of the first embodiment of the present invention described above, the method provides for marking the packets of the packet flow to be monitored by exploiting the marking procedure known as "alternate marking". Other techniques allowing to "mark" the packets of a given packet flow may be taken into consideration for the purpose of making them identifiable at the ingress point InP and the measurement points MsP. However, in the following description, only packets carrying the alternate marking will be considered for sake of example.

The "alternate marking" is described in, for instance, WO 2010/072251 (in the name of the same Applicant) and is used for implementing a given SoM. In particular, the alternate marking allows applying to the packets a SoM providing a measurement of a data loss between a transmitting node and a receiving node of the communication network CN.

According to WO 2010/072251, a data loss for a given packet flow is computed in the following way:
  at the transmitting node, the packet flow is subdivided in blocks, each block having a duration of a block period determined by the expiration of a timer, wherein blocks including packets marked by a first value alternate with blocks including packets marked by a second value (this is the marking procedure referred to as "alternate marking");

the transmitting node sets two counters which count, respectively, the packets marked by the first value and the packets marked by the second value;

at the receiving node, the marking bit of the packets is read, and two other counters are set sup, which count, respectively, the received packets with the first value and the received packets with the second value; and the values of four counters are cyclically sent by the transmitting node and the receiving node to a management server which calculates the data loss according to an operation which will not be described in greater detail herein after since it is not relevant to the present description.

For sake of example, the packet flows may be IP packet flows and the exemplary SoM considered herein after provides for measuring the data loss of the packets of an IP packet flow on the basis of the IP source address and IP destination address. It is to be noticed that this is merely an example, as other types of data flows may be considered and other identifying attributes of the packets may be used in alternative or in addition to the source and destination address as selection attributes.

The method according to this variant of the first embodiment of the present invention will be described in the following with reference to the flowcharts of FIGS. 3 and 4.

For each user that has subscribed to the exemplary SoM, an ingress point InP is set up in the node (in particular, in correspondence of the IP ingress interface of the node) through which the packet flow PF of the user enters the communication network CN. In the ingress point InP, a classification policy is instantiated containing a classification rule specifying that the packets Pki containing a specific couple of IP source address and IP destination address (as specified by the user when subscribing to the service) shall be monitored as it will be described herein after. The classification policy also specifies the block period (e.g. 5 minutes) for the alternate marking and a safety interval (e.g. 5 minutes).

At the ingress point InP, when a packet Pki matches the classification rule of the considered SoM classification policy (step 304), the ingress point InP preferably creates the relevant selection policy (step 305) by using the selection policy creation instructions, and then it starts introducing in the marking field MF of the packet Pki the alternate marking (step 308). In particular, according to this variant, the ingress point InP marks the packets Pki such that blocks of packets carrying a first value alternate in time with blocks of packets carrying a second value different from the first value. Preferably, when a new packet flow PF to be monitored arrives at the ingress node InP, the first block of packets is marked with the marking bits equal the first value, the second block is marked with the marking bits equal to the second value, the third block is marked with the marking bits equal to the first value, and so on. In particular, according to this variant, the ingress point may mark the packets Pki such that blocks of packets carrying a marking bit equal to 1 alternate in time with blocks of packets carrying a marking bit equal to 0. For example, according to this variant, when a new packet flow PF to be monitored arrives at the ingress node InP, the first block of packets is marked with the marking bit equal to 1, the second block is marked with the marking bit equal to 0, the third block is marked with the marking bit equal to 1, and so on.

Once the selection policy is created at the ingress point InP, any subsequent packet Pki of the packet flow PF is monitored according to the corresponding monitoring policy. In particular, a first counter may be set up counting the packets carrying the first value in the marking bits and a second counter counting the packets carrying the second value in the marking bits. Each time a time period equal to the sum of the block period and the safety interval expires, the ingress point InP sends to the monitoring center MC the value of the counter related to the preceding block period (indeed, this counter is not varying during the current block period) in order to calculate the data loss.

The selection policy created at the ingress point InP is preferably installed at each measuring point MsP along the route of the packets Pki (step 405), upon reception of a packet Pki which carries the first value in the marking bits. In this way, the packets Pki of the subsequent blocks within the packet flow PF match the selection policy and are then monitored according to the monitoring policy, as already described above with reference to the operations of the ingress point InP.

As already described above, the results of the monitoring actions (namely, in this case, the value of the counters) may be unreliable for the time period between the reception of the first packet Pki to be monitored at the ingress point InP and the installation of the selection policy at the egress point EgP. According to this variant of the first embodiment, the monitoring center MC preferably discards the results of the monitoring actions (i.e. the values of the counters) related to the first block of packets (if the block period is shorter than the time period of unreliable measures) or to a number of blocks of packets (if the block period is longer than the time period of unreliable measures).

Other SoMs may be implemented on the basis of the method described herein above, for measuring a data loss and/or an inter-arrival jitter and/or a delay of the packets. In particular, in addition to the counters counting the packets with the alternate marking, the measuring point MsP may generate timestamps in correspondence of the time at which predetermined packets within the packet flow PF are received, for instance the first packet of the packet flow and the last packet of the packet flow are received at a measuring point MsP. The timestamps may be sent to the monitoring center MC together with the counters at predefined time instants.

As mentioned above, restoration may be implemented for packets of a monitored packet flow PF at an egress node EgP of the communication network CN. When a packet Pki of the monitored packet flow PF arrives at the egress node, the egress point EgP instantiated therein preferably applies the selection policy. If the packet matches the selection policy, the egress point EgP preferably applies the monitoring policy. Moreover, the egress point EgP may restore the bits of the marking field MF to the pre-determined restoration value associated with the selection policy. For instance, as widely described above, in an IP communication network, at layer 3, the 3 least significant bits of the DSCP field may be used as marking field MF. In this case, at the egress point EgP, these bits may be restored to their original value.

Figure 5:
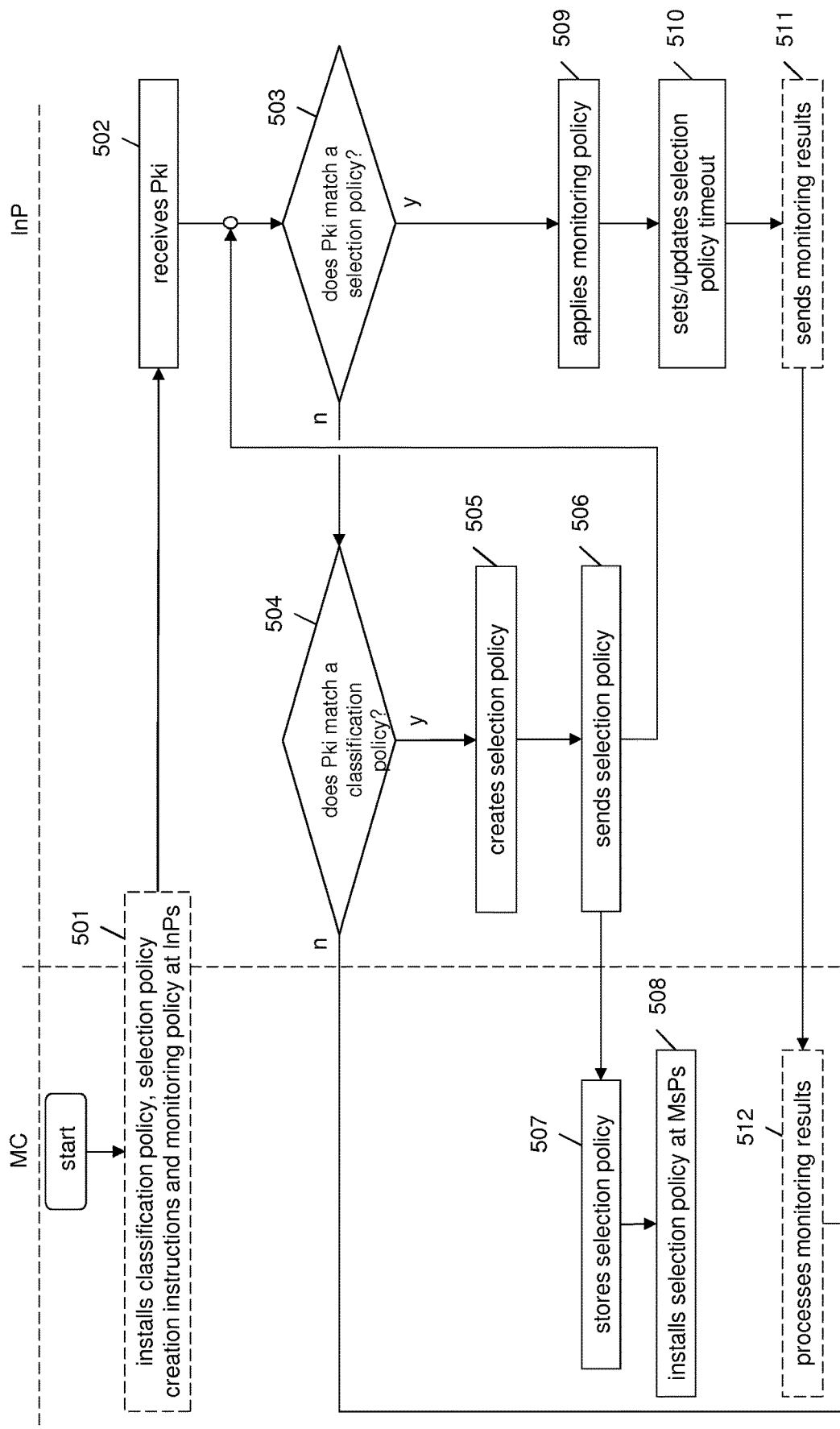
FIG. 5 is a flowchart of the method for monitoring a packet flow according to a second embodiment of the present invention.
Figure 6:
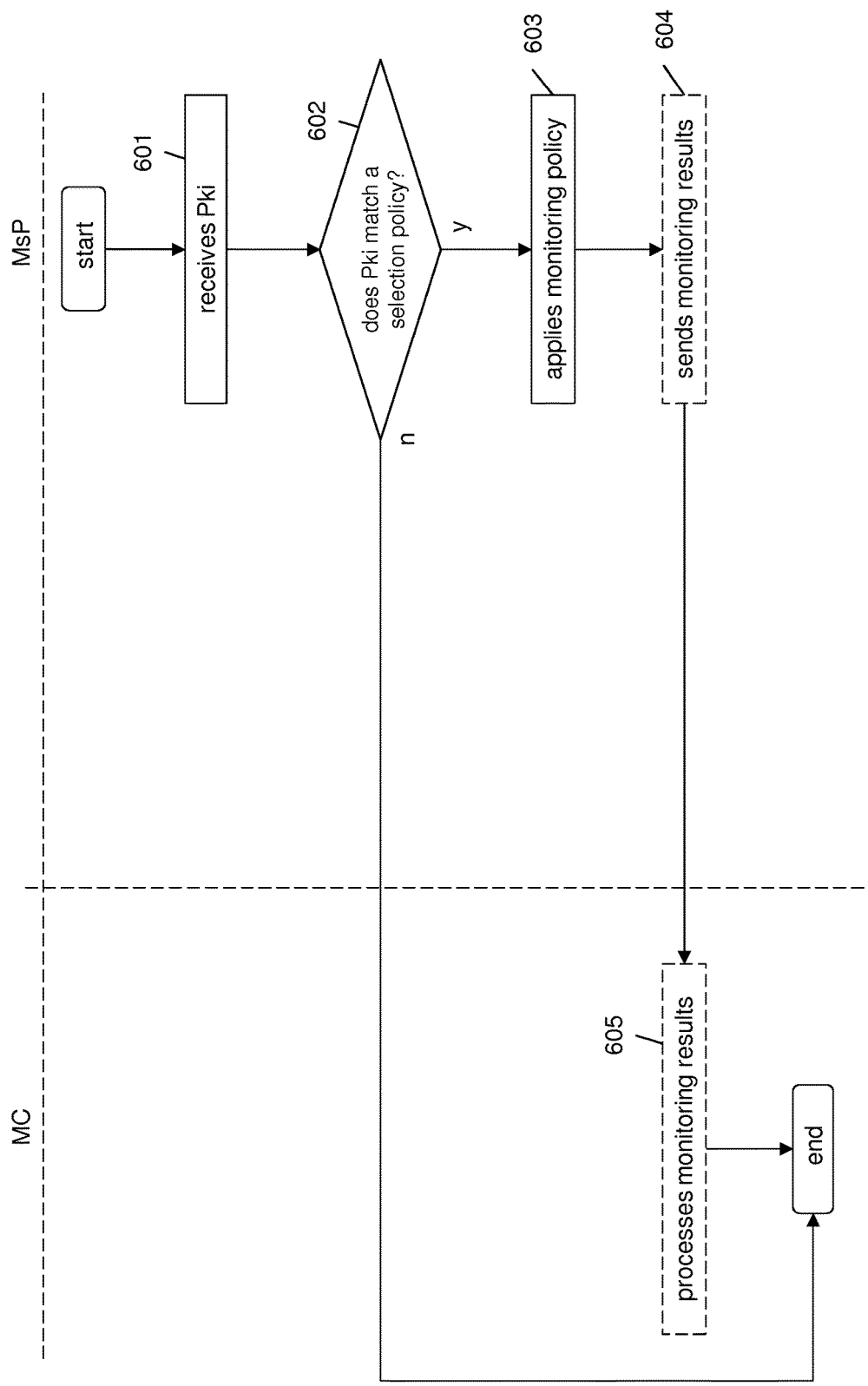
FIG. 6 is another flowchart of the method for monitoring a packet flow according to the second embodiment of the present invention.

A second embodiment of the method for monitoring the packet flow PF within the communication network CN will be described herein after, with reference to the flowcharts of FIGS. 5 and 6. FIG. 5 is a flowchart describing the operations of an ingress point InP in connection with the monitoring center MC while FIG. 6 shows a flowchart related to the operations of a measuring point MsP in connection with the monitoring center MC. According to this second embodiment of the present invention, steps 501 to 507 of the flowchart of FIG. 5 correspond to steps 301 to 307 of the flowchart of FIG. 3 related to the first embodiment of the present invention described above. A detailed description of these steps will hence be omitted. At step 507, the monitoring center MC stores the selection policy that has been created at the ingress point InP and associates it with the identifier of the ingress point InP, the service of monitoring and optionally the restoration value. Then, at step 508, the monitoring center MC preferably installs the selection policy and the associated monitoring policy at all the measuring points MsP that are reachable from the ingress point InP that has created the selection policy. According to this embodiment, the measuring points MsP that are reachable from the ingress point InP are identified as follows. Preferably, e.g. upon deployment of a service of monitoring within the communication network CN, the monitoring center MC is provided with a database comprising, for each ingress point InP, a list of all the measuring points MsP reachable from the ingress point InP. The monitoring center MC may also determine, upon deployment of a service of monitoring within the communication network CN, the list of all reachable measuring points from any ingress point on the basis of the network topology. Alternatively, the determination of the reachable measuring points may be performed by the monitoring center MC, upon reception of the message from the ingress point InP comprising the ingress point identifier (step 506). Also in this case the monitoring center MC may determine the list of all reachable measuring points on the basis of the network topology. Once the the measuring points MsP that are reachable from the ingress point InP are identified, the monitoring center MC preferably installs therein the selection policy, as specified above.

After the selection policy is created at the ingress point InP, when a packet Pki of the packet flow PF is received at the ingress point InP (step 502), at step 503 the check performed by the ingress point InP is affirmative, i.e. the packet Pki matches the local selection policy created and installed at the ingress point InP. Then, at step 509, the ingress point InP preferably applies the monitoring policy associated with the local selection policy and the considered SoM. Steps 510-512 correspond to steps 310-312 of the flowchart of FIG. 3, and hence their detailed description will be omitted.

According to this embodiment, when a packet Pki is received at the measuring point MsP (step 601 of the flowchart of FIG. 6), the measuring point MsP preferably checks whether the packet Pki matches a local selection policy, namely a selection policy already installed at the measuring point MsP (step 602). If the packet Pki does not match a local selection policy, no actions are further taken by the measuring point MsP and the packet is forwarded without being monitored by the MsP. If, at step 602, the check performed by the measuring point MsP is affirmative, i.e. the packet Pki matches the local selection policy installed at the measuring point MsP, the measuring point MsP preferably applies the monitoring policy associated with the local selection policy and the considered SoM (step 603). Steps 604 and 605 correspond to step 408 and 409 of the flowchart of FIG. 4.

According to this embodiment, no marking is performed at the ingress point InP. Indeed, each time a packet of a packet flow to be monitored at an ingress point matches a classification policy, the selection policy is created and then installed by the monitoring center at all the measuring points that shall apply monitoring actions on the packet. Hence, when subsequent packets of the packet flow are received at the measuring points, the selection policy is already installed therein and there is no need to send a request to the monitoring center for retrieving it.

According to the embodiments of the present invention described above, a selection policy may be uninstalled at the ingress points and the measuring points when it is no more active (namely, when the timeout associated to the selection policy has elapsed at the relevant ingress point). In particular, the monitoring center MC may periodically (e.g. every day at 2:00 pm) request the ingress points InP to provide the values of the timeouts associated with the local selection policies. Then, the monitoring center MC may check the values of the timeouts and request each ingress point InP to uninstall the local selection policies whose timeouts are elapsed. The same action may be performed at each egress point EgP. Moreover, the monitoring center MC, which, for each active selection policy (namely, for each selection policy whose timeout is not yet elapsed), holds the list of measuring points MsP at which the selection policy is installed, may request also the relevant measuring points MsP to uninstall the selection policies whose timeouts hare elapsed. Finally, the monitoring center MC preferably deletes these selection policies from its own storage memory.

As mentioned above, according to the present invention, the monitoring center MC holds a set of information related to each service of monitoring that is provisioned in the communication network CN. According to the present invention, this information may be updated in case the conditions for the provisioning of the service of monitoring change. For instance, an ingress point InP may be cancelled from the list of ingress points associated with a given service of monitoring when the service subscriber attached to that ingress point InP withdraws from the service of monitoring. In this case, the monitoring center MC may request the ingress point InP to uninstall the classification policy and delete from its storage memory the selection policy creation instructions, the monitoring policy and the selection policies associated with the service of monitoring. Then, the monitoring center MC may delete from its own storage memory the selection policies associated with the considered ingress point InP, which is finally cancelled from the list of ingress points associated with the service of monitoring.

Moreover, among the information stored at the monitoring center MC and related to a SoM, also the list of associated selection policies may be updated. In particular, the identifier of the ingress point InP associated with the selection policy may change. As described above, when the selection policy is stored at the monitoring center MC, it is associated with the identifier of the ingress point InP that has created the selection policy. However, the packet flow PF of the service subscriber attached to that ingress point InP may be rerouted or the subscriber may use a backup line, so that the packets Pki access the communication network from another ingress point associated with the same service of monitoring. In this case, the "new" ingress node, upon reception of the first packet of the packet flow PF, creates the appropriate selection policy and sends it to the monitoring center MC as described above with reference to, for instance, steps 305-306 of the flowchart of FIG. 3. Upon reception of a selection policy, the monitoring center MC may check whether a same selection policy is already stored therein, namely a stored selection policy associated with the same SoM and optionally the same restoration value as the received selection policy. In the situation described above, the same selection policy is already stored at the monitoring center MC as associated with the "old" ingress point. In this case, the monitoring center MC preferably replaces, within the list of selection policies, the identifier of the "old" ingress point with the identifier of the "new" ingress point as associated with the considered selection policy, and requests the "old" ingress point to uninstall the selection policy and to delete it from its storage memory.

According to a variant of the embodiments described above, at the monitoring center MC a selection policy may be associated with more than one ingress point InP. This variant may be implemented when the same service of monitoring is to be applied to packets accessing the communication network CN through different ingress nodes, for instance packets belonging to packet flows generated at different premises of a same subscriber to the service of monitoring.

In other words, the method according to this variant may be applied to a so-called "multipoint packet flow". The expression "multipoint packet flow" will designate herein after a packet flow comprising packets which are transmitted along two, or more, at least partially non overlapping end-to-end paths within the communication network CN. For instance, a multipoint packet flow may comprise two or more point-to-point packet flows with different source nodes that may possibly enter the communication network through different ingress nodes.

In this case, each ingress point, upon reception of the first packet of the multi-point packet flow to be monitored, creates the appropriate selection policy and sends it to the monitoring center MC, as described above with reference to, for instance, steps 305-306 of the flowchart of FIG. 3. Upon reception of a selection policy, the monitoring center MC preferably checks whether a same selection policy is already stored therein, namely a stored selection policy associated with the same SoM and optionally the same restoration value as the received selection policy. In the situation described above, if no such selection policy is already stored at the monitoring center MC, the monitoring center MC preferably stores the received selection policy and associates it with the ingress point InP that sent the message. If the selection policy is already stored at the monitoring center MC, the monitoring center MC preferably adds, to the information associated with the considered selection policy, the identifier of the ingress point InP that sent the message. This way, at the monitoring center MC the selection policy is associated with all the ingress points InP through which the multi-point packet flow enters the communication network CN.

When, at an ingress point InP of the multi-point packet flow, the timeout of the selection policy elapses, the selection policy is uninstalled from the considered ingress point InP. However, according to this variant, the selection policy is not deleted from the storage memory of the monitoring center MC as in other ingress points InP of the multi-point packet flow the timeouts of the selection policy may not be elapsed. Moreover, the monitoring center MC, which, for each active selection policy holds the list of measuring points MsP at which the selection policy is installed, may request to uninstall the selection policy only to the measuring points MsP that are topologically not reachable from the ingress points InP at which the selection policy is still active. The determination of the measuring points MsP that are topologically not reachable from an ingress points InP may be performed at the monitoring center MC, for instance as already described above with reference to step 506 of the flowchart of FIG. 5. Alternatively, the monitoring center MC may request to uninstall the selection policy to all the relevant measuring points MsP only once it is uninstalled from all the ingress points InP of the multi-point packet flow.

According to a third embodiment of the present invention, a "bidirectional" SoM is deployed within the communication network CN for monitoring packets. In particular, according to this embodiment, when a SoM (which will be referred to in the following description as "master SoM") is deployed within the communication network CN for monitoring the packets Pki of a packet flow PF along their route from a source node to a destination node, a further SoM is deployed within the communication network CN for monitoring the packets of a further packet flow along an opposite route (namely, from the destination node to the source node of the packet flow PF). This further SoM will be indicated in the following description as "slave SoM". This embodiment of the present invention may relate to services for monitoring the packets sent and received by a user through the Internet.

According to this embodiment of the present invention, upon deployment of a master SoM within the communication network CN, the corresponding policies (namely, at least one classification policy and the monitoring policy), the selection policy creation instructions and the list of ingress and egress points of the master SoM are preferably installed and stored at the monitoring center MC by, e.g. the network operator responsible of the service of monitoring. Moreover, at the monitoring center MC, the same type of data are stored for the slave SoM, namely corresponding selection policy creation instructions, a list of ingress points and a list of egress points. The selection policy creation instructions for a slave SoM preferably allows creating a selection policy for the slave SoM on the basis of the selection policy of the master SoM. The monitoring policy of the slave SoM is the same as the monitoring policy of the master SoM. No classification policies are associated with the slave SoM.

The method according to this third embodiment of the present invention will be described in detail herein after with reference to the flowcharts of FIGS. 3, 4 and 7. The deployment and application of the master SoM within the communication network CN is analogous to what has been already described above with reference to the first embodiment of the present invention. Therefore, the description of the operations related to the implementation of the master SoM and involving the ingress point InP and the monitoring center MC (FIG. 3) and each measuring point MsP and the monitoring center MC (FIG. 4) will be omitted here. It should be noticed that, according to this third embodiment, the deployment and application of the master SoM within the communication network CN may alternatively be performed in the same manner already described above with reference to the second embodiment of the present invention. However, for sake of non limiting example, in the following description reference will be made to the steps of the method performed, at the ingress point InP, the measuring points MsP and the monitoring center MC, according to the first embodiment of the present invention.

According to this third embodiment, when, according to step 307 of the flowchart of FIG. 3, a selection policy for a master SoM is stored at the monitoring center MC after having been created at the ingress point InP of the master SoM, the monitoring center MC preferably creates a further selection policy (step 701 of the flowchart of FIG. 7), which will be referred to as "slave selection policy", and associates it with the selection policy of the master SoM. The slave selection policy allows identifying a packet flow to be monitored according to the slave SoM. The slave selection policy is preferably created by applying the corresponding selection policy creation instructions on the selection policy of the master SoM. Preferably, the selection policy of the slave SoM mirrors the selection policy of the master SoM.

Indeed, for instance, in case the selection policy of the master SoM allows identifying a packet flow of packets with a given address in the source address field of the packet's header, the selection policy of the slave SoM allows identifying a packet flow of packets with the same address but in the destination address field within the packet's header. Moreover, if, for instance, the selection policy of the master SoM allows identifying a packet flow PF of packets with a given couple of source and destination addresses, the selection policy of the slave SoM allows identifying a packet flow of packets that are routed in the opposite direction, and hence it comprises the source address of the packet flow PF in the destination address field and the destination address of the packet flow PF in the source address field.

At step 702 of the method according to this third embodiment, the monitoring center MC preferably sends the slave selection policy to the ingress points InP of the slave SoM. Each ingress point InP preferably stores the slave selection policy in a dedicated database. In the meanwhile, the monitoring center MC preferably deletes the slave selection policy from its own storage memory.

At step 703, the ingress point InP of the slave SoM preferably receives a packet Pki. At step 704, the ingress point InP preferably checks whether the packet Pki matches a local selection policy. If the packet does not match any local selection policy (which is the case upon arrival of the first packet to be monitored according to the slave SoM), the ingress point InP preferably checks whether the packet matches one of the slave selection policies stored in the dedicated database at the ingress point InP (step 705). In the negative, the packet is forwarded without being monitored. In the affirmative case, the slave selection policy is preferably installed at the ingress point InP (step 706) and becomes an active selection policy. Then, the ingress point InP preferably sends a message to the monitoring center MC comprising the relevant slave selection policy (namely, the selection policy with which the packet matches), data indicating the ingress point InP on which the slave selection policy is installed and, optionally, a restoration value (step 707). At step 708, the monitoring center MC receives the message from the ingress point InP and stores the slave selection policy with the information related to the ingress point InP at which the selection policy has been installed and, possibly, the restoration value received from the ingress point InP. At this point, the slave selection policy may be sent and installed in any measuring point MsP according to steps 401-405 of the flowchart of FIG. 4.

In alternative, at step 702, the monitoring center MC may store the slave selection policy as a "stand-by selection policy" (for instance, in a dedicated database), i.e. in such a way that it can not be sent to any measuring point until it is associated with data indicating at least one ingress point InP (and, optionally, a restoration value) receiving a packet matching the slave selection policy. Then, at step 707 the ingress point InP preferably sends a message to the monitoring center MC comprising the data indicating the ingress point InP on which the slave selection policy is installed and, optionally, the restoration value. At this point, the monitoring center MC preferably stores the slave selection policy as an active selection policy, so that it can be installed at any measuring point MsP along the route of the packets matching it.

At step 709 the ingress point InP preferably deletes from the dedicated database the slave selection policy that has been installed.

Figure 7:
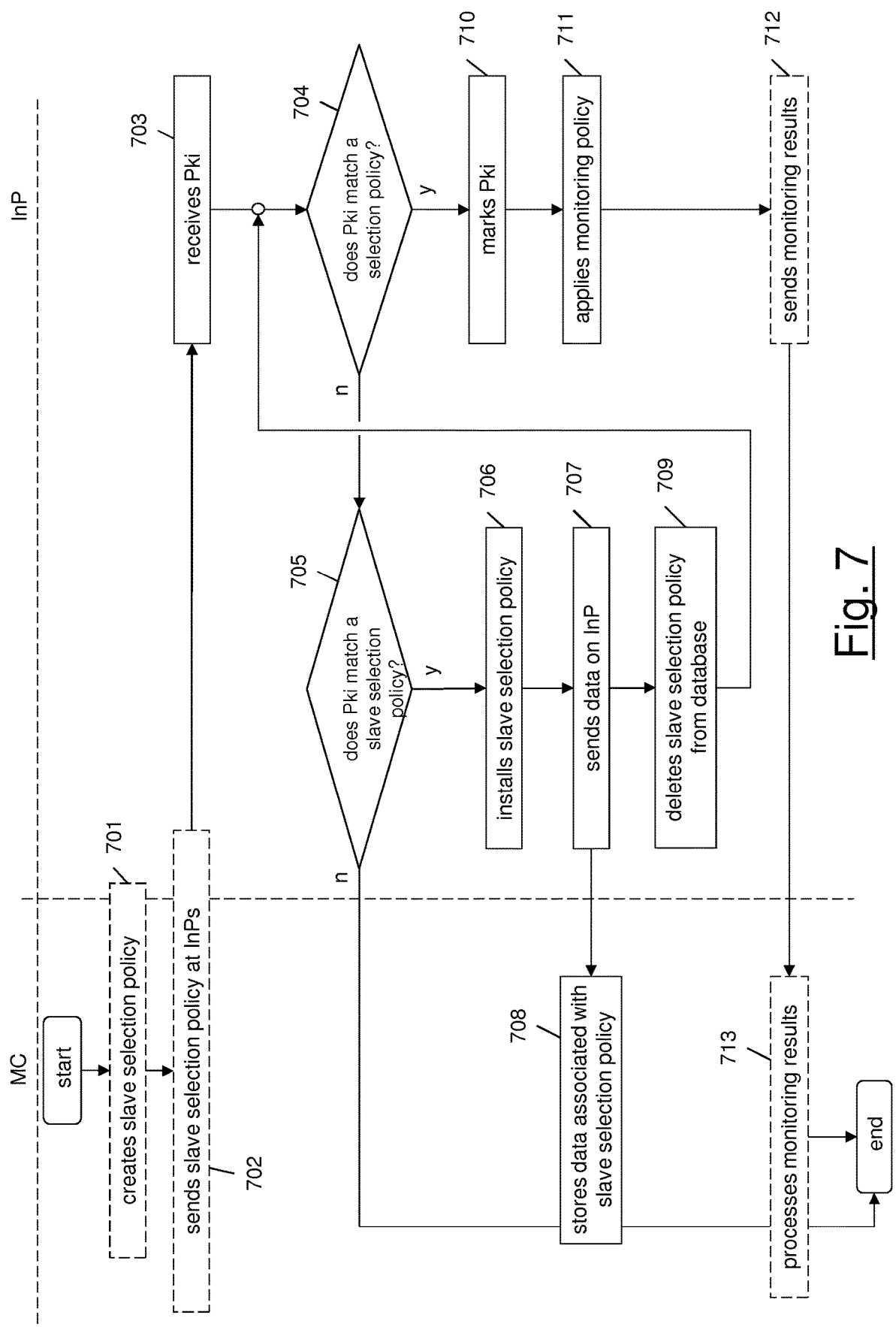
FIG. 7 is a flowchart of the method for monitoring a packet flow according to a third embodiment of the present invention.

Steps 710, 711, 712 and 713 of the flowchart of FIG. 7 are similar to steps 308, 309, 311, and 312 of the flowchart of FIG. 3 and hence a detailed description of these steps will be omitted here. According to this embodiment, no timeout is associated with the slave selection policy. According to this embodiment, a slave selection policy is preferably uninstalled at the relevant ingress points, at the measuring points and at the monitoring center MC when the corresponding selection policy of the master SoM is uninstalled.

The monitoring center MC may then install the slave selection policy at the measuring points MsP for the implementation of the slave SoM within the communication network CN, as already described above with reference to the flowchart of FIG. 4.

According to a variant of this third embodiment, upon deployment of the slave SoM, the slave selection policies are directly installed at the ingress points of the slave SoM, without being first temporarily stored in the dedicated database of the ingress points as described above. In this case, when a packet matches a slave selection policy, a message is sent to the monitoring center MC from the ingress point InP containing the data indicating the ingress point InP and optionally the restoration value and the monitoring center MC preferably associates these data with the slave selection policy, so that the selection policy may then be installed at the measuring points MsP.

The present invention has a number of advantages.

The method of the present invention allows avoiding to indiscriminately monitor all the packet flows being routed within the communication network, as provided by known tracing algorithms. Moreover, the present invention allows avoiding to configure a priori the routing device for tracing the packet flows. Indeed, according to the present invention, the monitoring of packets is performed according to a selection policy which is instantiated at the nodes of the network upon subscription by the user to a given SoM. The selection policy may then be cancelled when the user unsubscribe to the service. Therefore, only the packet flow of interest for the user is monitored. Determining which packets are to be monitored is performed at the point(s) of access of the packet flow to the communication network on the basis of a classification policy containing few and simple classification rules. The selection policy then allows identifying the packet flow on the basis of predefined attributes of the packet flow comprised within the header of the packets. This identification may then be performed in the measuring points upon installation of the relevant selection policy. At the measuring point, indeed, it is the presence of the selection policy that allows automatically identifying the packet as a packet to be monitored (no further checks are needed for this purpose) and triggers the implementation of the service.

The method according to the present invention advantageously allows a minimal pre-configuration of the network nodes. Indeed, it strictly requires that only the classification policy and the monitoring policy are installed at the ingress node for a user. The other nodes (e.g. the nodes hosting the measurement points) may not be preconfigured at all, thanks to the dynamic management of the selection policies. The number of classification rules to be installed in the network nodes is minimized and the classification rules may advantageously be very simple.

Moreover, the enforcement of a SoM is advantageously automatic thanks to the classification and selection policies, and it is made highly efficient by the dynamic installation of the selection policy and the monitoring policy at a measuring point. The dynamic management the selection and monitoring policies allows adapting the service to changing conditions under which the SoM is applied, for instance changing number of service subscribers.

When a new subscriber subscribes to a SoM which is already provisioned in the communication network for other users, it is only necessary to add an ingress point at the network entry node of the packet flow of the new subscriber. This ingress point may be efficiently cancelled once the new subscriber unsubscribe to the service. The measuring points need not to be configured or reconfigured, at most a selection policy shall be added or updated, as described above.

For the reasons above, the present invention allows to efficiently implement subscription based SoMs. For sake of example, the present invention allows to efficiently implement a SoM (e.g. a packet tracing service) for the users that, within the 24 hours before the service activation, made a complaint about the network performances (e.g. reduced data download capacity), and those users shall be substituted with other users on a day-by-day basis. In this case, the present invention provides for dynamically adapting the selection policy and activating the subscription based service in a very efficient manner.

The invention claimed is:

1. A method for monitoring packets in a communication network, said method comprising:
   a) at an ingress point of said communication network, classifying at least one packet of a traffic received at the ingress point for determining whether packets of said traffic are to be monitored and, in the affirmative, associating them with a service of monitoring;
   b) creating, by said ingress point, a selection policy to identify a packet flow of said packets to be monitored according to the service of monitoring, the selection policy being based on a classification policy used to classify the at least one packet in step a);
   c) sending, by said ingress point, said selection policy to identify the packet flow of said packets to be monitored according to the service of monitoring to a monitoring center;
   d) marking, by said ingress point, the packets of said packet flow to be monitored, said marking including setting a feature of each packet of the packet flow to be monitored to a given value suitable for distinguishing each packet of said packet flow to be monitored from unmarked packets of another packet flow that is not to be monitored and said marking including setting one or more bits of a given field of a header of each packet of said packet flow to be monitored to a predetermined value;
   e) checking, at one or more measuring point within the communication network, whether a received packet matches an already installed selection policy to identify a packet flow of packets to be monitored that is already installed at said one or more measuring point
   f) when the received packet fails to match the already installed selection policy to identify the packet flow of packets to be monitored that is already installed at said one or more measuring point, checking, by the one or more measuring point, whether said received packet is marked by having the given value suitable for distinguishing the received packet from the unmarked packets of the other packet flow that is not to be monitored in its header;
   g) when said received packet is marked by having the given value suitable for distinguishing the received packet from the unmarked packets of the other packet flow that is not to be monitored in its header, sending, by the one or more measuring point, a request to the monitoring center based upon attributes of the received packet to check whether said selection policy to identify the packet flow of said packets to be monitored according to the service of monitoring created by the ingress point exists;
   h) receiving, by the one or more measuring point, said selection policy to identify the packet flow of said packets to be monitored according to the service of monitoring that was created by the ingress point
   i) installing, by the one or more measuring point, said selection policy to identify the packet flow of said packets to be monitored according to the service of monitoring that was created by the ingress point;
   j) at each of said one or more measuring point identifying said packet flow on the basis of said installed selection policy created by the ingress point; and
   k) at each of said one or more measuring point applying monitoring actions associated with said service of monitoring to said identified packet flow.

2. The method according to claim 1, wherein said classifying is performed by applying a classification policy comprising one or more classification rules to be applied to one or more classification attributes of the packets.

3. The method according to claim 2, wherein said one or more classification attributes are defined among identifying attributes comprised within the header of said packets.

4. The method according to claim 3, wherein said identifying attributes comprise one or more of: a source address, a destination address, a source port number, a destination port number, a transmission protocol, a class of service.

5. The method according to claim 2, wherein said creating the selection policy comprises applying selection policy creation instructions associated with said service of monitoring.

6. The method according to claim 2, wherein said selection policy comprises one or more predefined values or ranges for one or more selection attributes for identifying the packets of said packet flow, said selection attributes being defined among said identifying attributes of the packets.

7. The method according to claim 1, wherein the method further comprises, at an egress point of said communication network, restoring said feature of said marked packet to a predetermined restoration value associated with said selection policy.

8. The method according to claim 1, wherein said marking comprises:
   subdividing said packets of said packet flow to be monitored in first blocks and second blocks, said first blocks alternating in time with said second blocks,
   setting said feature of the packets of said first blocks to a first predetermined value, and
   setting said feature of the packets of said second blocks to a second predetermined value different from said first predetermined value.

9. The method according to claim 1, wherein the method further comprises, after said step b), creating, on the basis of said selection policy, a further selection policy to identify a further packet flow of packets to be monitored along an opposite direction with respect to said packet flow.

10. The method according to claim 1, further comprising uninstalling the selection policy from the one or more measuring point upon satisfaction of a predetermined condition related to the selection policy.

11. A node for a communication network comprising:
   an ingress point configured to:
      classify at least one packet of a traffic received at the node for determining whether packets of said traffic are to be monitored and, in the affirmative, associate them with a service of monitoring;

create a selection policy to identify a packet flow of said packets to be monitored according to the service of monitoring, the selection policy being based on a classification policy used to classify the at least one packet;

send said selection policy to identify the packet flow of said packets to be monitored according to the service of monitoring to a monitoring center; and mark the packets of said packet flow to be monitored, said marking including setting a feature of each packet of the packet flow to be monitored to a given value suitable for distinguishing each packet of said packet flow to be monitored from unmarked packets of another packet flow that is not to be monitored and said marking including setting one or more bits of a given field of a header of each packet of said packet flow to be monitored to a predetermined value; and a measuring point configured to:

check whether a received packet matches an already installed selection policy to identify a packet flow of packets to be monitored that is already installed at said measuring point;

when the received packet fails to match the already installed selection policy to identify the packet flow of packets to be monitored that is already installed at said measuring point, check whether said received packet is marked by having the given value suitable for distinguishing the received packet from the unmarked packets of the other packet flow that is not to be monitored in its header;

when said received packet is marked by having the given value suitable for distinguishing the received packet from the unmarked packets of the other packet flow that is not to be monitored in its header, send a request to the monitoring center based upon attributes of the received packet to check whether said selection policy to identify the packet flow of said packets to be monitored according to the service of monitoring created by the ingress point exists:

receive said selection policy to identify the packet flow of said packets to be monitored according to the service of monitoring that was created by the ingress point install said selection policy to identify the packet flow of said packets to be monitored according to the service of monitoring that was created by the ingress point identify said packet flow on the basis of said installed selection policy created by the ingress point and apply monitoring actions associated with said service of monitoring to said identified packet flow.

12. A communication network comprising:

a first node configured to:

classify at least one packet of a traffic received for determining whether packets of said traffic are to be monitored and, in the affirmative, associate them with a service of monitoring;

create a selection policy to identify a packet flow of said packets to be monitored according to the service of monitoring, the selection policy being based on a classification policy used to classify the at least one packet send said selection policy to identify the packet flow of said packets to be monitored according to the service of monitoring to a monitoring center; and mark the packets of said packet flow to be monitored, said marking including setting a feature of each packet of the packet flow to be monitored to a given value suitable for distinguishing each packet of said packet flow to be monitored from unmarked packets of another packet flow that is not to be monitored and said marking including setting one or more bits of a given field of a header of each packet of said packet flow to be monitored to a predetermined value; and a second node configured to:

check whether a received packet matches an already installed selection policy to identify a packet flow of packets to be monitored that is already installed at said second node;

when the received packet fails to match the already installed selection policy to identify the packet flow of packets to be monitored that is already installed at said second node, check whether said received packet is marked by having the given value suitable for distinguishing the received packet from the unmarked packets of the other packet flow that is not to be monitored in its header;

when said received packet is marked by having the given value suitable for distinguishing the received packet from the unmarked packets of the other packet flow that is not to be monitored in its header, send a request to the monitoring center based upon attributes of the received packet to check whether said selection policy to identify the packet flow of said packets to be monitored according to the service of monitoring created by the first node exists;

receive said selection policy to identify the packet flow of said packets to be monitored according to the service of monitoring that was created by the first node;

install said selection policy to identify the packet flow of said packets to be monitored according to the service of monitoring that was created by the first node;

identify said packet flow on the basis of said installed selection policy created by the first node; and apply monitoring actions associated with said service of monitoring to said identified packet flow.

\* \* \* \* \*